United States Patent [19]
Yuri et al.

[11] Patent Number: 5,970,739
[45] Date of Patent: Oct. 26, 1999

[54] RECTIFYING APPARATUS FOR ABSORPTION REFRIGERATOR

[75] Inventors: Nobuyuki Yuri; Manabu Kagawa; Mitsuru Ishikawa, all of Saitama, Japan

[73] Assignee: Honda Giken Kogyo Kabushiki Kaisha, Tokyo, Japan

[21] Appl. No.: 09/123,451

[22] Filed: Jul. 28, 1998

[30] Foreign Application Priority Data

Jul. 30, 1997 [JP] Japan ................................ 9-219186

[51] Int. Cl.$^6$ ........................................... F25B 33/00
[52] U.S. Cl. ................................. 62/495; 62/906
[58] Field of Search ........................ 62/476, 495, 497, 62/906, 494, 484

[56] References Cited

U.S. PATENT DOCUMENTS 2,363,381  11/1944  Anderson ........................... 62/497
3,805,546   4/1974  Lenning ............................ 62/496
5,857,355   1/1999  Hwang ............................. 62/476

FOREIGN PATENT DOCUMENTS 63-10450  3/1988  Japan .

*Primary Examiner*—William Doerrler
*Attorney, Agent, or Firm*—Armstrong, Westerman, Hattori, McLeland & Naughton

[57] ABSTRACT

In a rectifying apparatus of vapor/liquid contact type, the rectifier 5 is disposed above a regenerator 4 and has two stages, a lower recovery stage and an upper condensation stage. The two stages are filled with filler elements 7a, 7b and 7c, 7d, respectively. Each filler elements 7a and 7c has a conical bottom for biasing the falling liquid towards its center and the rising refrigerant vapor towards its outer edge. The rising speed of the refrigerant vapor is made more uniform and the falling liquid has less tendency to drip down along the side wall. As the contact between the vapor and the liquid is increased, the efficiency of rectification is enhanced.

5 Claims, 3 Drawing Sheets

FIG. 3
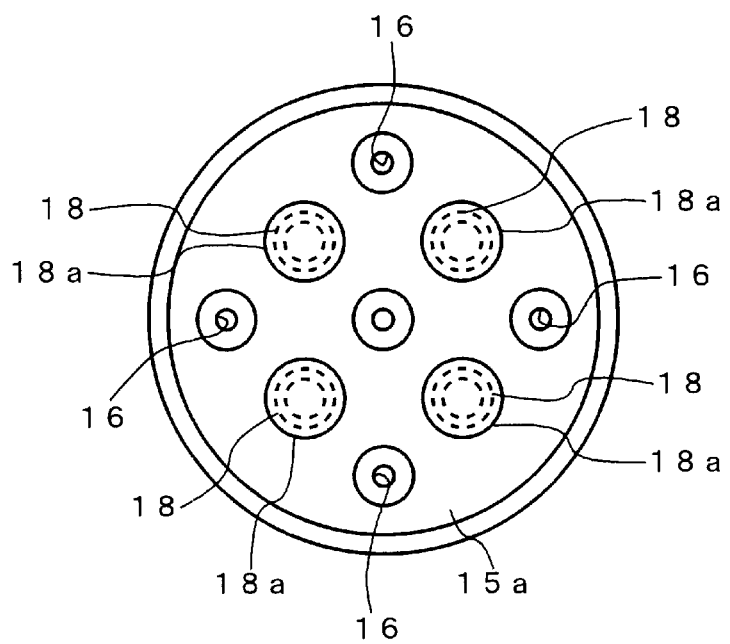
FIG. 4A
FIG. 4B
PRIOR ART
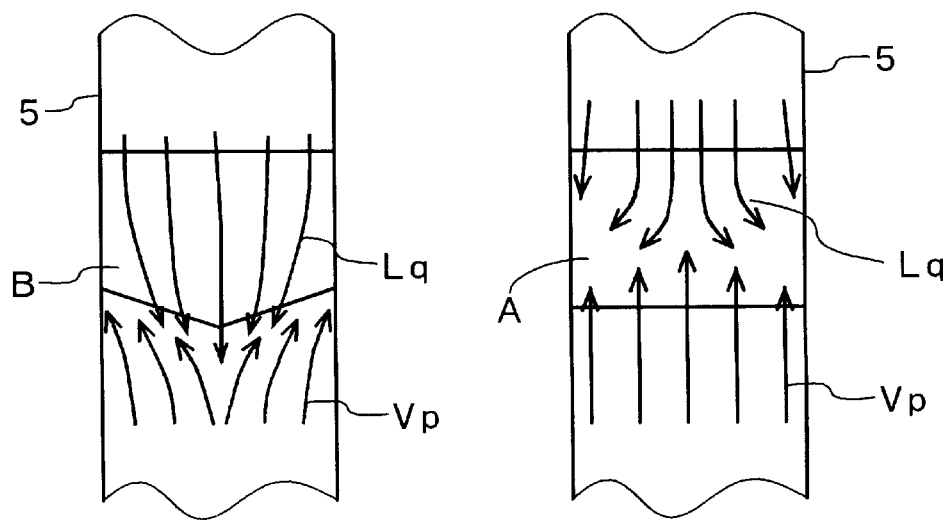

RECTIFYING APPARATUS FOR ABSORPTION REFRIGERATOR

BACKGROUND OF THE INVENTION

1. Field of the Invention

The present invention relates to a rectifier for an absorption refrigerator and particularly, to a rectifying apparatus for an absorption refrigerator suited for increasing the performance for regenerating an absorbent solution and a refrigerant liquid.

2. Description of the Related Art

In an absorption refrigerator using absorption refrigeration cycle, a refrigerant which has been vapored and thus lowered in the temperature and an absorbent solution which has absorbed the refrigerant vapor and been high in the temperature are exposed to a chilled water and a cooling water respectively for producing cooling and warming in air conditioning. When the absorbent solution absorbs the refrigerant vapor, it is lowered in the concentration of the absorbent thus decreasing its absorption capability. For recovering the concentration in the absorbent solution, a regenerator in which the refrigerant vapor is released from the absorbent solution is provided. Also, a rectifier is provided for rectifying the refrigerant vapor released in the regenerator to a higher purity level and delivering it to a condenser.

The rectifier is generally a tubular tower called as "a rectifying column" filled with chip type filling materials such as pall rings or Raschig rings. In the rectifier, while the absorbent solution of a lower concentration or diluted solution is passed downwardly through the chip type filling material filler, the refrigerant vapor sent upwardly from the regenerator is forced to directly contact with the diluted solution to increase its purity.

The diluted solution passed downwardly in the rectifier may however run along and close to the inner wall of the rectifier. Also, the refrigerant vapor sent upwardly tends to be lower in the velocity close to the inner wall and higher about the center due to the friction with the surface of the inner wall. Most of the downward flow is pushed by the vapor toward the inner wall surface of the rectifier and this causes less running of the flow about the center. This will discourage the contact between the vapor and the liquid and the purity of the refrigerant vapor will hardly be increased to a desired rate.

For compensation, a modified rectifier using specific filler elements is disclosed in Japanese Utility Model Laid-open Publication No. (Sho) 63-19459. The filler element used here is a tubular form of steel mesh fabricated by rolling a waveform metal fiber such as stainless steel wire. In particular, the roll is characterized in that the concentration of wire is higher in a central region by rolling tight than in an outer edge region. As the filler element is highly intensified in density at the central region, the flow of the refrigerant vapor is biased towards the outer edge where the density is lower and its rising velocity will be uniform throughout the cross section of the rectifier column. The downward flow of the diluted solution passed through the rectifier may tend to run along close to the center of the filler element due to capillary effects. For biasing the downward flow towards the outer edge, a dispersing plate of a conical shape is used together with the filler element.

However, such a conventional rectifier using the above mentioned filler elements offers the following disadvantage. Generally, a plurality of the filler elements are stacked one over another for increasing the purity of the refrigerant vapor. When the filler elements are disposed in layers in the prior art rectifier, the dispersing plates have to be disposed between any two adjacent filler elements as well as at the lowermost of the rectifier. This entails an intricate construction of the rectifier and increases its overall height. Accordingly, the prior art rectifier will be increased in dimensions hence being unfavorable for use in a small, household absorption refrigerator. In addition, the conical shape dispersing plates have to be precisely assembled at given intervals for optimum effect using a complex process in the production.

SUMMARY OF THE INVENTION

It is an object of the present invention to provide a rectifying apparatus for an absorption refrigerator in which, the refrigerant vapor is highly purified with a simple arrangement of filler elements thus increasing the efficiency of operation.

A rectifying apparatus for a absorption refrigerator according to the present invention is provided for passing a refrigerant vapor generated in a regenerator through a vapor/liquid contact block to increase its purity and supplying the refrigerant vapor of a higher purity back to a condenser and characterized in that the vapor/liquid contact block comprises a liquid dispersing means for dispersing the contact liquid to have contact with the refrigerant vapor throughout an larger area, and a filler elements disposed beneath the liquid dispersing means and having a conical structure with a center region of the bottom projected downwardly for implementing the optimum contact of the contact liquid dropped from the liquid dispersing means with the refrigerant vapor.

In operation, the flow of the liquid dispersed from the liquid dispersing means over the filler element is biased towards the center of the conically shaped bottom of the filler element while running downwardly through the filler element. Also, the refrigerant vapor sent upwardly from the below of the filler element is radially deflected towards the outer edge of the filler element as running along the conically shaped bottom.

BRIEF DESCRIPTION OF THE DRAWINGS

FIG. 3 is a plan view of a dispersing means; and

FIG. 4 is a schematic view showing comparison in action between the rectifying apparatus for the present embodiment and a conventional device.

DETAILED DESCRIPTION OF THE PREFERRED EMBODIMENT

Figure 2:
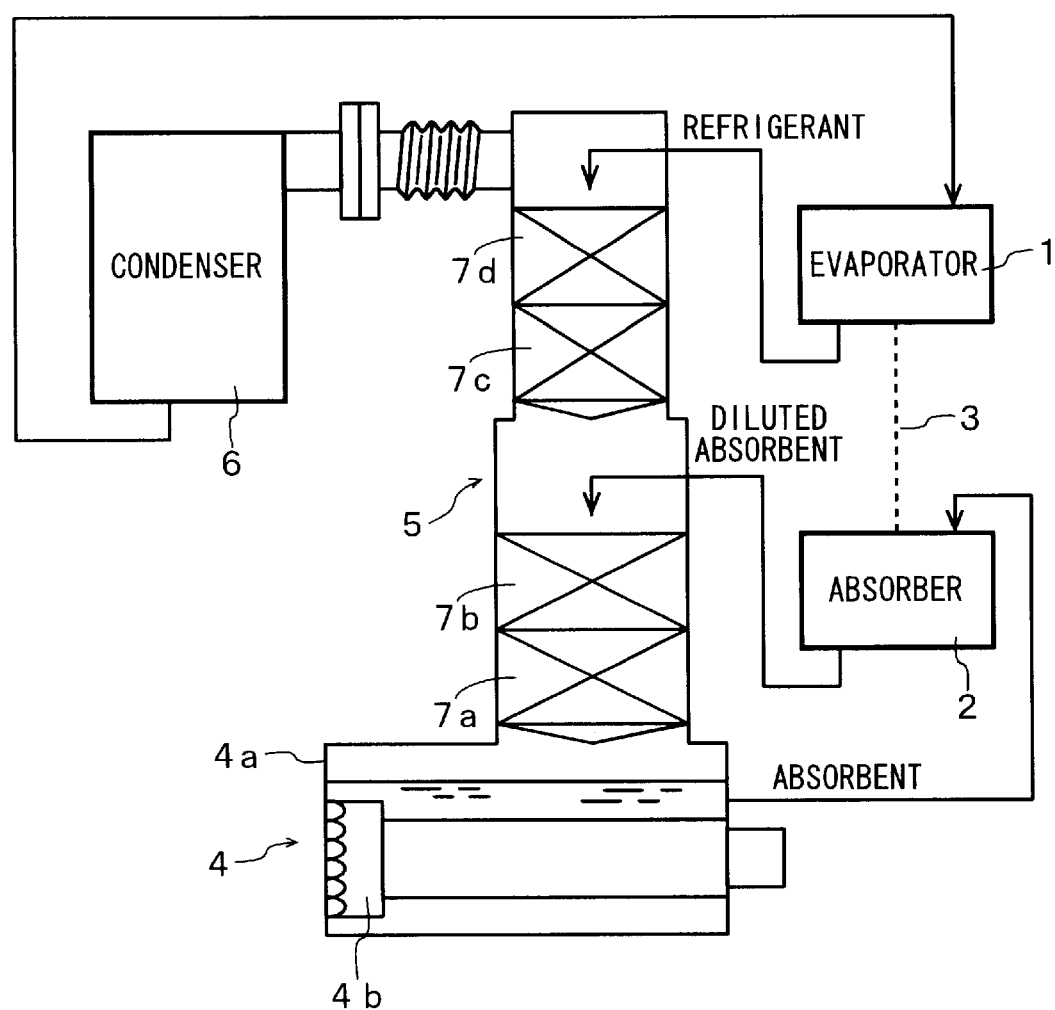
FIG. 2 is a block diagram of a circulation system for a refrigerant and an absorbent solution in an absorption refrigerator equipped with the rectifying apparatus according to the present embodiment.

The present invention will be described in more detail referring to the accompanying drawings. FIG. 2 is a block diagram showing a circulation system for an absorbent solution and a refrigerant in an absorption refrigerator equipped with a rectifier apparatus of the present invention. As shown, an evaporator 1 contains the refrigerant, for example, fluoro-alcohol such as trifluoroethanol (TFE) and an absorber 2 contains the absorbent solution such as dimethyl imidazolidinon (DMI) derivative solution. The evaporator 1 and the absorber 2 are fluidly connected to each other by a (refrigerant) vapor passage 3. When the evaporator 1 and the absorber 2 are maintained at a low pressure of about 30 mmHg, the refrigerant is vapored in the evaporator 1, passed through the vapor passage 3, and delivered into the absorber 2 where it is absorbed in the absorbent solution.

As the refrigerant evaporates, its temperature drops down; as the absorbent solution absorbs the refrigerant vapor, its temperature rises up, hence generating an absorption refrigeration circle. The evaporator 1 has a tube (not shown) therein through which a chilled water runs. Also, the absorber 2 has a tube (not shown) therein through which a cooling water runs. The liquid refrigerant decreased in temperature and the absorbent solution increased in temperature are showered over the corresponding tubes, respectively, so as to cool down the chilled water and warm up the cooling water, respectively. The chilled water cooled down by the refrigerant and the cooling water warmed up by the absorbent solution are distributed to, for example, indoor units of an air-conditioning system for cooling and warming, respectively.

As the absorbent solution has absorbed the refrigerant vapor and its concentration of the absorbent is lowered, the absorption capability will decline. For increasing the concentration to restore the absorption capability, a regenerator 4 and a rectifier 5 are provided in a combination. The regenerator 4 comprises a tank 4a for storing the absorbent solution and a gas burner 4b as a heating means for heating the absorbent solution. The heating means is preferably a gas burner and may be an electric heater or any other applicable heating device.

The rectifier 5 located over the regenerator 4 has a cylindrical construction as a whole including a recovery stage at the lower position where filler elements (referred to as "fillers" hereinafter) 7a and 7b are placed, and a condensation stage at the upper position where fillers 7c and 7d are placed. The (diluted) absorbent solution of which concentration has been decreased in the absorber 2 is introduced into the recovery stage and dropped over the filler 7b. Since the refrigerant in the evaporator 2 is also slowly and gradually decreased in the purity, its small portion is transferred to the rectifier 5 for restoring its purity. More specifically, the refrigerant of which purity is declined is introduced into the condensation stage and dropped over the filler 7d. The rectifier 5 is fluidly connected at the top to the condenser 6 where the refrigerant vapor is condensed to its liquid form.

A predetermined amount of the absorbent solution is stored in the tank 4a of the regenerator 4 and it is heated up when the gas burner 4b is lit to release the refrigerant vapor due to a difference of the boiling point between the absorbent and the refrigerant. At the time, the refrigerant vapor is not fully separated from the absorbent solution but contains some absorbent solution. Meanwhile, the delivery of the diluted absorbent solution from the absorber 2 is started. While the diluted absorbent solution runs downward through the fillers 7a and 7b, it directly contacts with the refrigerant vapor which moves upward from lower, hence lowering the temperature of the refrigerant vapor. Accordingly, as the refrigerant vapor moves upward, it causes the absorption solution mixed therein to be liquefied and removed and its purity will gradually increase.

The refrigerant transferred from the evaporator 1 contains a very small amount of the absorbent and when it flows down through the fillers 7c and 7d in the condensation stage, it comes into direct contact with the refrigerant vapor passed through the recovery stage. This causes the temperature of the refrigerant vapor to be decreased thus accelerating release of the residual absorbent from the refrigerant. Accordingly, the purity of the refrigerant vapor will be more increased. The refrigerant vapor with the increased purity is delivered from the condensation stage to the condenser 6 where it is condensed into liquid before forwarding into the evaporator 1.

Figure 1:
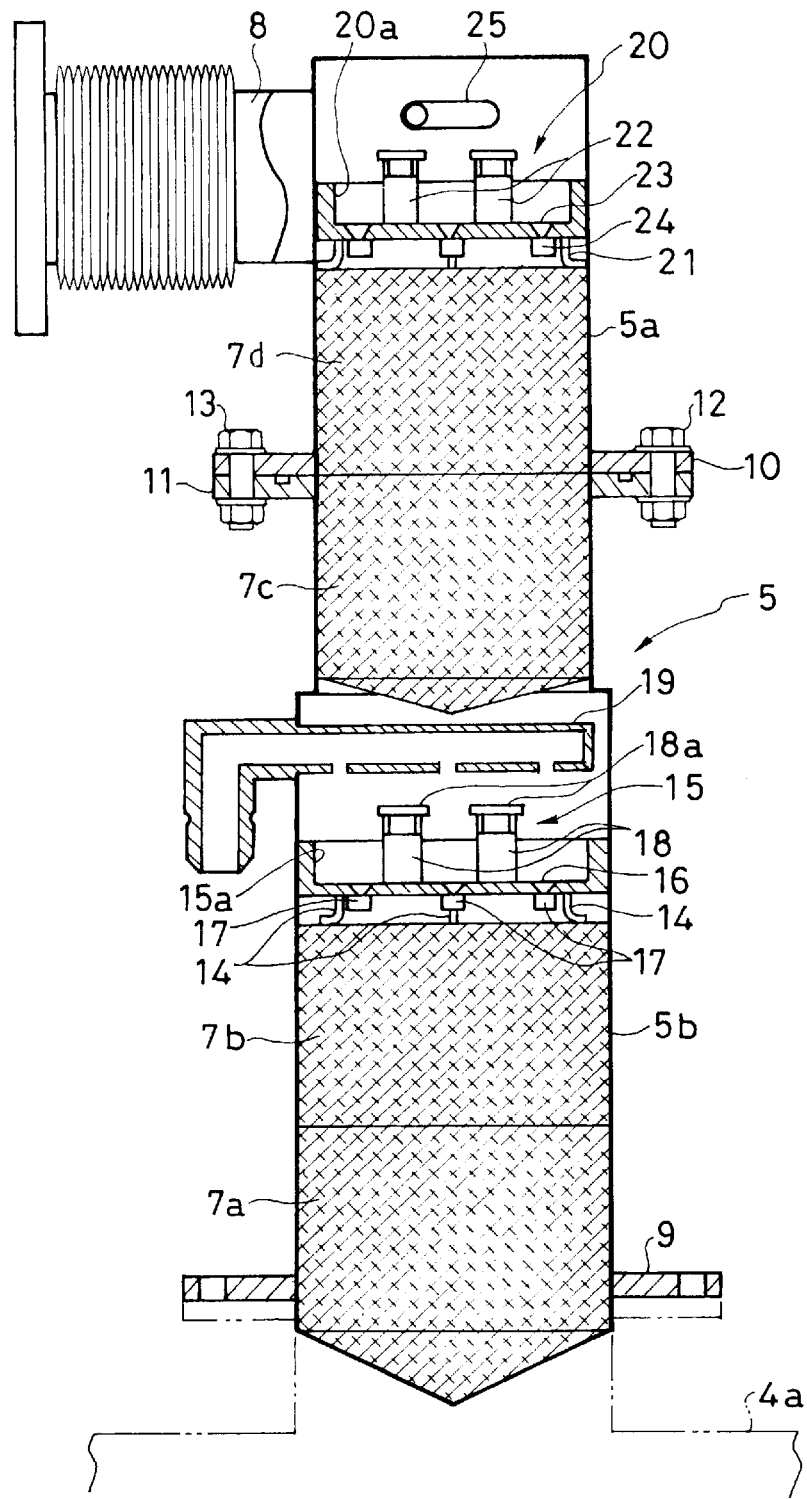
FIG. 1 is a cross sectional view of a rectifying apparatus showing an embodiment of the present invention.

The construction of the rectifier 5 is now explained in more detail. FIG. 1 is an enlarged cross sectional view of the rectifier 5 having a cylindrical structure which comprises an upper half of the smaller-diameter block 5a and a lower half of the larger-diameter block 5b. The cylindrical structure is closed at the top and opened at the bottom for communication with the upper open end of a tank 4a of the regenerator 4. The cylindrical structure has, at its upper side wall, a connector tube 8 provided with a flange 8a for communication with the condenser 6. A flange 9 is mounted to a lower end portion of the large-diameter block 5b. The flange 9 is fixed with bolts (not shown) to the tank 4a of the regenerator 4. The rectifier 5 consists of two main units which are joined to each other by retaining members 12 and 13 of bolts and nuts tightened across two flanges 10 and 11 of their respective units at an intermediate of the small-diameter block 5a. In other words, the rectifier 5 can be separated into two of the main units by removing the tightening members 12 and 13.

The large-diameter block 5b is filled with the fillers 7a and 7b stacked one over the other. The filler 7a has a lower bottom surface extending downwardly at a center region to provide a conical shape. Similarly, the small-diameter block 5a is filled with the fillers 7c and 7d stacked one over the other and the lower filler 7c has a bottom surface extending downwardly at a center region to provide a conical shape. It should be noted that the words "conical shape" used here is not limited to a configuration defined in the solid geometry but may include any 3-dimensional shape having a central region raised higher than remaining rim portions. The fillers will be explained later in more detail.

A dispersing unit 15 is mounted on the upper surface of the filler 7b and has legs 14 thereof provided for keeping a distance from the upper surface of the filler 7b. The dispersing unit 15 is best shown in FIG. 3. The dispersing unit 15 includes a dispersing plate 15a of a basin-like shape or a tubular shape with a bottom for receiving the diluted solution. The dispersing plate 15a has a number of drop apertures 16 (for example, five in FIG. 3) provided in the bottom for allowing the diluted solution to fall down. Each of the drop apertures 16 is funnel-shaped, as shown in FIG. 1, for ease of collecting flows of the diluted solution. A corresponding number of dispersing nozzles 17 are fixedly mounted to the lower side surface of the bottom of the dispersing plate 15a so that they are located beneath the drop apertures 16, respectively. A group (for example, four in FIG. 3) of refrigerant passages (risers) 18 of a tubular shape are vertically mounted on the upper side surface of the bottom of the dispersing plate 15a between the drop apertures 16. The risers 18 are communicated with apertures (not shown) provided in the bottom of the dispersing plate 15a for passing the refrigerator vapor.

A nozzle 19 extending horizontally through a side wall of the large-diameter block 5b is mounted above the dispersing unit 15 for dropping the diluted solution onto the dispersing plate 15a. For the application, the nozzle 19 has its distal end closed, while it has a multiplicity of tiny holes (not shown) provided in a lower half wall of the horizontal portion thereof for dropping the diluted solution. The riser 18 has a cap 18a thereover for preventing the diluted solution from directly dropping through the riser 18. The cap 18a allows the refrigerant vapor running upwards through the riser 18 to flow horizontally and move out from side openings of the riser 18 before running upwards.

The nozzle 19 may be disposed so that the multiplicity of tiny holes are not positioned just over but off the risers 18 which are thus prevented from directly receiving the diluted solution and the fluid drops dripping from the filler 7c. In that case, the caps 18a are eliminated and the structure of the risers 18 will be simplified and fabricated with much ease.

A dispersing unit 20 is provided above the filler 7d in the small-diameter block 5a in the similar manner to the dispersing unit 15. The dispersing unit 20 has a dispersing plate 20a supported by legs 21 and is provided with risers 22, funnel-shaped apertures 23, and dispersing nozzles 24 corresponding to the funnel-shaped apertures 23. A nozzle 25 arranged in the similar manner to the nozzle 19 is disposed over the dispersing unit 20 for supplying the dispersing unit 20a with the refrigerant liquid which contains a very small amount of the absorbent and is sent from the evaporator 1.

The fillers 7a to 7d are now explained in more detail. A procedure for fabricating the fillers 7a and 7c starts with weaving wires, for example, stainless steel wires, into a strip of net and winding it into a roll. The roll is loaded into a tubular mold, which has a tubular structure with an extending conical bottom, and pressed at the periphery portion against the conical bottom to raise at the center thereof. As the result, the fillers 7a and 7c are fabricated having a shape shown in FIG. 1. The shape of the roll may be produced by sticking out the center portion of the roll in a direction of its axis to have a conical projection. As the conical projection is formed on one end of the roll, in this case, a conical depression is made in the other end.

For fabricating the fillers 7b and 7d, the same procedure of producing a roll as for the fillers 7a and 7c may be used. Also, the roll may be reshaped in a mold to increase its density or the strip may tightly be wound in to a roll with a desired shape and sizes.

The fillers 7a to 7d are not limited to be fabricated from the strips of net but may be fabricated by compressing a multiplicity of wires or fibers in a mold into a desired shape. It is also possible to fill a bag of net having a conical bottom with pieces of wire or chip materials such as pall rings or Raschig rings for making the filler which is then load in the rectifier 5.

It is essential that each of fillers has any conically bottomed shape suited for passing and delivering drops of the liquid onto the dispersing unit 15 and the regenerator 4. The filler assembly is not necessarily divided into two pieces of the fillers 7a and 7b or 7c and 7d and may be an integrated form in the recovery or condensation stage, respectively. The separation into two pieces entails the smaller size of the fillers 7a to 7d and will thus be handled with much ease for handling.

The comparison between the embodiment of the present invention and the conventional one is now explained in the respect of the rising flow of the refrigerant vapor and the falling flow or drops of liquid. FIG. 4 is a schematic diagram showing these two kind of flows; FIG. 4(a) illustrates that of the embodiment and FIG. 4(b) represents that of the conventional one. As apparent, a conventional filler structure A in the rectifier 5 is flat on both of the top and bottom surfaces thus having a uniform density which causes a falling flow Lq of the liquid in the center portion to be biased towards the outer edge portion and a rising flow Vp of the refrigerant vapor has a higher speed in the center portion than in the periphery portion. These two kinds of phenomena accelerate biasing of the flow Lq towards the side wall of the rectifier 5.

The filler structure B having a conical bottom surface in the rectifier 5 of the embodiment, on the contrary, allows the falling flow Lq of the liquid to be biased towards the center as dripping along the tapered bottom of the filler B. Simultaneously, the refrigerant vapor flow Vp tends to diverge due to the tapered bottom towards the outer edge of the filler B and the divergence of the vapor can thus offset the higher speed thereof at the center portion. Accordingly, the rising speed of the vapor flow will be uniform hence ensuring optimum contact between the vapor and the liquid and increasing the efficiency of rectification.

If the fluid retainability is too high, the holdup or flooding of the fluid tends to occur. Therefore, the fluid retainability of the filler has to be suitably set. The conically bottomed filler structure B according to the present invention permits downward flow to be biased towards the center of the bottom throughout a wide range of the fluid retainability of the filler and will guarantee smooth falling of the flows. Accordingly, the fluid retainability of the filler can be adjusted with much ease and the contact between the rising vapor and the falling liquid will be improved. As the flows run along the tapered bottom surface towards the center portion, its contact area with the vapor at the bottom of filler will be increased.

As set forth above, the present invention allows the flow of the refrigerant vapor rising to be diverged and spread out towards the outer edge of the cylindrical filler and thus made uniform in its speed distribution throughout the cross section. Accordingly, the falling flow of the liquid will be ensured for running smoothly at about uniform speed through the filler. Since the flow of the liquid having passed through the filler is biased towards the center portion as dripping along the tapered bottom of the filler, its contact area with the rising vapor will be increased and thus contributing to the increase of the efficiency of rectification.

What is claimed is:

1. A rectifying apparatus for an absorption refrigerator for passing a refrigerant vapor generated in a regenerator through a vapor/liquid contact block to increase its purity and supplying the refrigerant vapor of a higher purity back to a condenser, said the vapor/liquid contact block comprising:

liquid dispersing means for dispersing the contact liquid to have contact with the refrigerant vapor throughout a larger area; and filler elements disposed beneath the liquid dispersing means and having a conical structure with a center region of the bottom projected downwardly for implementing the optimum contact of the contact liquid dripped from the liquid dispersing means with the refrigerant vapor passing through the filler elements.

2. A rectifying apparatus for an absorption refrigerator according to claim 1, wherein the vapor/liquid contact block includes an upper and a lower stages and further comprises:

a refrigerant liquid dropping nozzle mounted over the liquid dispersing means in the upper stage; and an absorbent solution dropping nozzle mounted over the liquid dispersing means in the lower stage;

wherein the lower stage of the vapor/liquid contact block serving as a recovery stage where the absorbent solution flowing in one direction and the refrigerant vapor flowing in the other opposite direction contact with each other and the upper stage of the vapor/liquid contact block serving as a condensation stage where the refrigerant liquid flowing in one direction and the refrigerant vapor flowing in the other opposite direction contact with each other.

3. A rectifying apparatus in a absorption refrigerator according to claim 2, wherein each of the liquid dispersing means in the upper and the lower stages includes a riser for directing the flow of the refrigerant vapor towards the corresponding nozzle therethrough.

4. A rectifying apparatus in a absorption refrigerator according to claim 3, wherein the risers mounted in the liquid dispersing means at the recovery stage are located beneath and off the center of the filler element.

5. A rectifying apparatus in a absorption refrigerator according to claim 1, wherein the filler element is a roll of net which has a central region of the bottom projected downwardly in a conical form with a periphery portion of the roll being compressed in a direction of a roll axis at the bottom.

* * * * *